United States Patent [19]

Hildebrand et al.

[11] Patent Number: 5,338,249

[45] Date of Patent: Aug. 16, 1994

[54] METHOD AND APPARATUS FOR FRESH-AIR CONTROL IN THE MID-LEVEL AREA OF A MOTOR VEHICLE

[75] Inventors: Reinhard Hildebrand, Redwitz; Michael Schramm, Neustadt, both of Fed. Rep. of Germany

[73] Assignee: Siemens Aktiengesellschaft, München, Fed. Rep. of Germany

[21] Appl. No.: 177,748

[22] Filed: Sep. 7, 1993

Related U.S. Application Data

[63] Continuation of Ser. No. 768,673, filed as PCT/DE90/00258, Mar. 30, 1990, abandoned.

[30] Foreign Application Priority Data

Mar. 31, 1989 [DE] Fed. Rep. of Germany ....... 3910489

[51] Int. Cl.$^5$ ............................................... B60H 1/12
[52] U.S. Cl. ................................... 454/126; 454/121; 454/160
[58] Field of Search ............... 454/121, 126, 148, 156, 454/159, 160, 161

[56] References Cited

U.S. PATENT DOCUMENTS

| | | | |
|---|---|---|---|
| 4,515,208 | 5/1985 | Sakurai et al. | 454/160 X |
| 4,549,692 | 10/1985 | Busch et al. | 237/12.3 |
| 4,681,153 | 7/1987 | Uchida | 165/31 |

FOREIGN PATENT DOCUMENTS

| | | |
|---|---|---|
| 0102611 | 3/1984 | European Pat. Off. . |
| 0267101 | 5/1988 | European Pat. Off. . |
| 0337382 | 10/1989 | European Pat. Off. . |
| 3338768 | 1/1988 | Fed. Rep. of Germany . |
| 56-124511 | 9/1981 | Japan . |
| 63-11413 | 1/1988 | Japan . |
| 188514 | 8/1988 | Japan ............................ 454/160 |
| 63-235117 | 9/1988 | Japan . |

*Primary Examiner*—Harold Joyce
*Attorney, Agent, or Firm*—Kenyon & Kenyon

[57] ABSTRACT

A central control unit having an air-distribution control formed as a control knob that has a FLOOR LEVEL setting, a DEFROSTER setting, and a MID-LEVEL setting therebetween. A method includes the steps of: actuating with the control knob a first air flap disposed in a fresh-air duct; supplying air to at least one fresh-air nozzle in the mid-level area; controlling with the control knob a supplementary air flap disposed in a warm-air supplementary duct via the first air flap that is directly coupled to the supplementary air flap; supplying the fresh-air nozzle with air by the supplementary air flap; positioning the control knob such that in the MID-LEVEL setting the first air flap is in an open position for fresh-air admission and the supplementary air flap is in a closed position relative to a heater core; positioning the control knob such that in a setting between the MID-LEVEL and DEFROSTER or FLOOR LEVEL settings the first air flap is in the open position for fresh-air admission and the supplementary air flap is in the open position relative to the heater core; and positioning the control knob such that in the DEFROSTER setting or the FLOOR LEVEL setting the first air flap is in the closed position for fresh-air admission and the supplementary air flap is in the closed position relative to the heater core.

31 Claims, 5 Drawing Sheets

METHOD AND APPARATUS FOR FRESH-AIR CONTROL IN THE MID-LEVEL AREA OF A MOTOR VEHICLE

This application is a continuation of application Ser. No. 07/768,673, filed as PCT/DE90/00258, Mar. 30, 1990, abandoned.

The invention relates generally to a method and system for controlling fresh-air and more particularly to a method and system for controlling fresh-air in the mid-level area of a motor vehicle.

In such a method known through prior public use, a control knob on the central control unit is turned to a MID-LEVEL setting to route the unheated fresh air moved by a fan through a fresh-air duct to one or more nozzles disposed in the mid-level area. Alternatively, the control knob is turned to a DEFROSTER setting to route the air through a defroster air duct to the windshield after it is heated in a heater core to a greater or lesser extent, depending on the setting of the temperature selector on the control unit. The control knob may also be turned to a FLOOR LEVEL setting to route the air to the floor area of the motor vehicle, again after the air is heated in the heater core to a greater or lesser extent, depending on the setting of the temperature selector. To establish the various air flows, flaps in the individual air ducts identified above are moved between a fully-open position and a fully-closed position as a function of the control knob. In addition, the volume of air flowing in the suction duct on the intake side can be adjusted, generally by means of an air-volume regulator on the control unit.

So that an undesirable fresh-air flow from the mid-level nozzles does not occur, especially when the outside temperatures are cold, the known systems discussed above include a special control means for closing the fresh-air nozzle opening to a greater or lesser extent.

Moreover, German patent 33 38 768 discloses a means for obtaining a comfortable headroom temperature when there are very cold outside temperatures by automatically mixing warm air with the cold outside air entering through the discharge nozzle. The headroom temperature is cooler than that of the air which, under otherwise equal conditions, is routed to the defroster or floor-level nozzles. In this known approach the temperature is controlled with air flaps located downstream of the heater core, a warm-air bypass duct extending parallel to the fresh-air duct and a shut-off flap, actuated by a separate control means which simultaneously opens or closes both the fresh-air duct and the bypass duct with the warm air. Independent of this, an air-distribution control is provided that is similar to the above-mentioned known fresh-air control.

The problem in the prior art is that there is no fresh-air control system in a motor vehicle which provides greater ventilation comfort, particularly with very low outside-air temperatures, by mechanically simple means that permit compact installation and ease of operation.

The present invention provides a method for controlling fresh-air in a mid-level area of an instrument panel of a motor vehicle. The method utilizes a heating and air-conditioning system that is controlled by a thermostat on a water side and a central control unit having an air-distribution control formed as a control knob that has a FLOOR LEVEL setting, a DEFROSTER setting, and a MID-LEVEL setting therebetween. The method includes the steps of: actuating with the control knob a first air flap disposed in a fresh-air duct; supplying air to at least one fresh-air nozzle in the mid-level area; controlling with the control knob a supplementary air flap disposed in a warm-air supplementary duct via the first air flap that is directly coupled to the supplementary air flap; supplying the fresh-air nozzle with air by the supplementary air flap; positioning the control knob such that in the MID-LEVEL setting the first air flap is in an open position for fresh-air admission and the supplementary air flap is in a closed position relative to a heater core; positioning the control knob such that in a setting between the MID-LEVEL and DEFROSTER or FLOOR LEVEL settings the first air flap is in the open position for fresh-air admission and the supplementary air flap is in the open position relative to the heater core; and positioning the control knob such that in the DEFROSTER setting or the FLOOR LEVEL setting the first air flap is in the closed position for fresh-air admission and the supplementary air flap is in the closed position relative to the heater core.

The method of the invention makes it possible to conveniently mix a fresh-air stream issuing from the mid-level nozzles with air heated to as great a degree as desired without additional controls on the instrument panel. The method uses the air-distribution control that is already in place on the central control unit, without additional transmission means to the heating and air-conditioning system that would crowd the tight mounting space behind the instrument panel. Depending on the setting of the air-distribution control on the central control unit, it becomes possible not only to adjust the general air distribution in the vehicle but also to mix the fresh air being moved to the mid-level area with a greater or lesser amount of warm air, the amount of which is not necessarily dependent on the outside-air temperature but advantageously depends on the choice of air distribution.

When the air distribution is adjusted by means of a slotted disk positioned by the air-distribution control in the heating and air-conditioning system, air flaps actuated by the slotted disk through transmission levers that are located in a fresh-air duct, and a defroster air duct and a floor-level air duct, the method of the invention can be implemented in a mechanically simple manner merely by providing, in addition to the fresh-air duct, a warm-air bypass duct controllable by means of a supplementary air flap, and by either coupling the actuation of the supplementary air flap in the warm-air bypass duct directly to the link already provided for actuation of the air flap in the fresh-air duct, or by indirectly coupling the supplementary air flap and link through the slotted disk.

According to one aspect of the method of the invention, provision is made for the first air flap and the supplementary air flap to be half open in a position midway between the MID-LEVEL setting and the DEFROSTER or FLOOR LEVEL setting (that is, in the bi-level setting). The coupling of the supplementary air flap to the first air flap may be simply and advantageously varied, as desired by the customer, between linear and progressive or degressive transmission over a given range between the MID-LEVEL setting and the DEFROSTER or FLOOR LEVEL setting.

An additional increase in comfort can be obtained when there is a provision for mixing the fresh air for the mid-level area with a substantially constant and high proportion of warm air while the first air flap is approximately in its mid-open or mid-closed position, notwithstanding its longer opening or closing travel. This feature is obtained by the indirect coupling of the drives of the first air flap and the supplementary air flap, particularly by means of a slotted disk having a specific track path, and an intermediate hold position of the supplementary air flap.

The advantages of the configuration of the invention include the cross sectional dimensions of the fresh-air duct relative to the warm-air bypass duct, and the more or less pronounced linear coupling of the additional air flap to the first air flap. These features advantageously result in the air flow that issues from the fresh-air nozzle having a lower temperature than the air flow from the air duct serving the floor area, but a higher temperature than in the MID-LEVEL setting of the air-distribution control. Furthermore, the volumetric flow from the fresh-air nozzle is advantageously less in the position intermediate between the MID-LEVEL setting and the DEFROSTER or FLOOR LEVEL setting than in the straight MID-LEVEL setting. An additional increase in comfort is achieved when the volumetric flow from the fresh-air nozzle is reduced even more as the temperature increases in comparison with the bi-level position when the air-distribution control is rotated from the hi-level setting to the DEFROSTER or FLOOR LEVEL setting.

Figure 1:
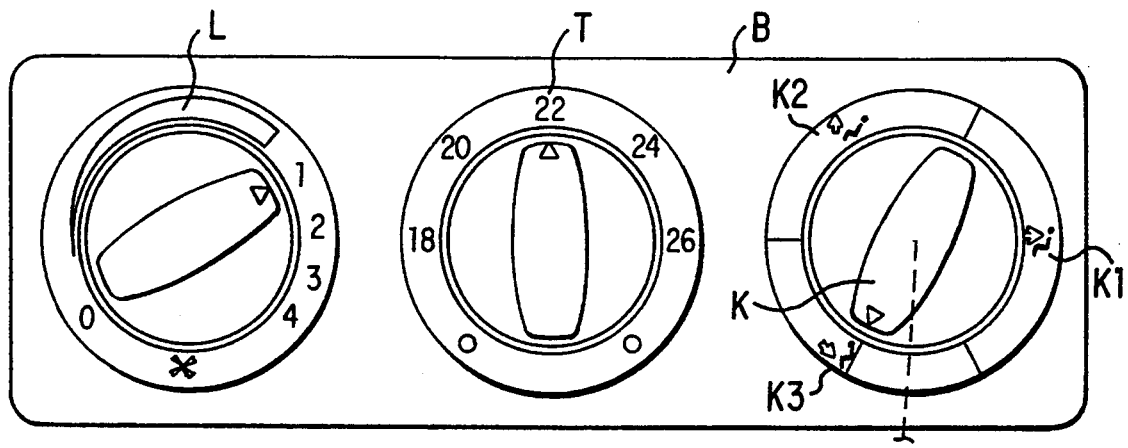
FIG. 1 is a front view of a central control unit of a motor vehicle.

FIG. 1 shows a central control unit B that is mounted at mid-level in a motor vehicle which includes a blower switch B for controlling the air flow-rate. The speed of a central blower VE of FIG. 2 at the inlet to the heating and air-conditioning system can be adjusted in a stepwise manner; a temperature selector T, controls the temperature, preferably on the water side in a heater core WT located between the outlet of the central blower VE and the inlets of the various air ducts and an air-distribution controller in the form of a control knob K which can be rotated to three settings, MID-LEVEL (K1), DEFROSTER (K2), and FLOOR LEVEL (K3), which are marked with appropriate symbols. The control knob may also be turned to settings intermediate between MID-LEVEL (K1) and DEFROSTER (K2), or between MID-LEVEL (K1) and FLOOR LEVEL (K3).

Figure 2:
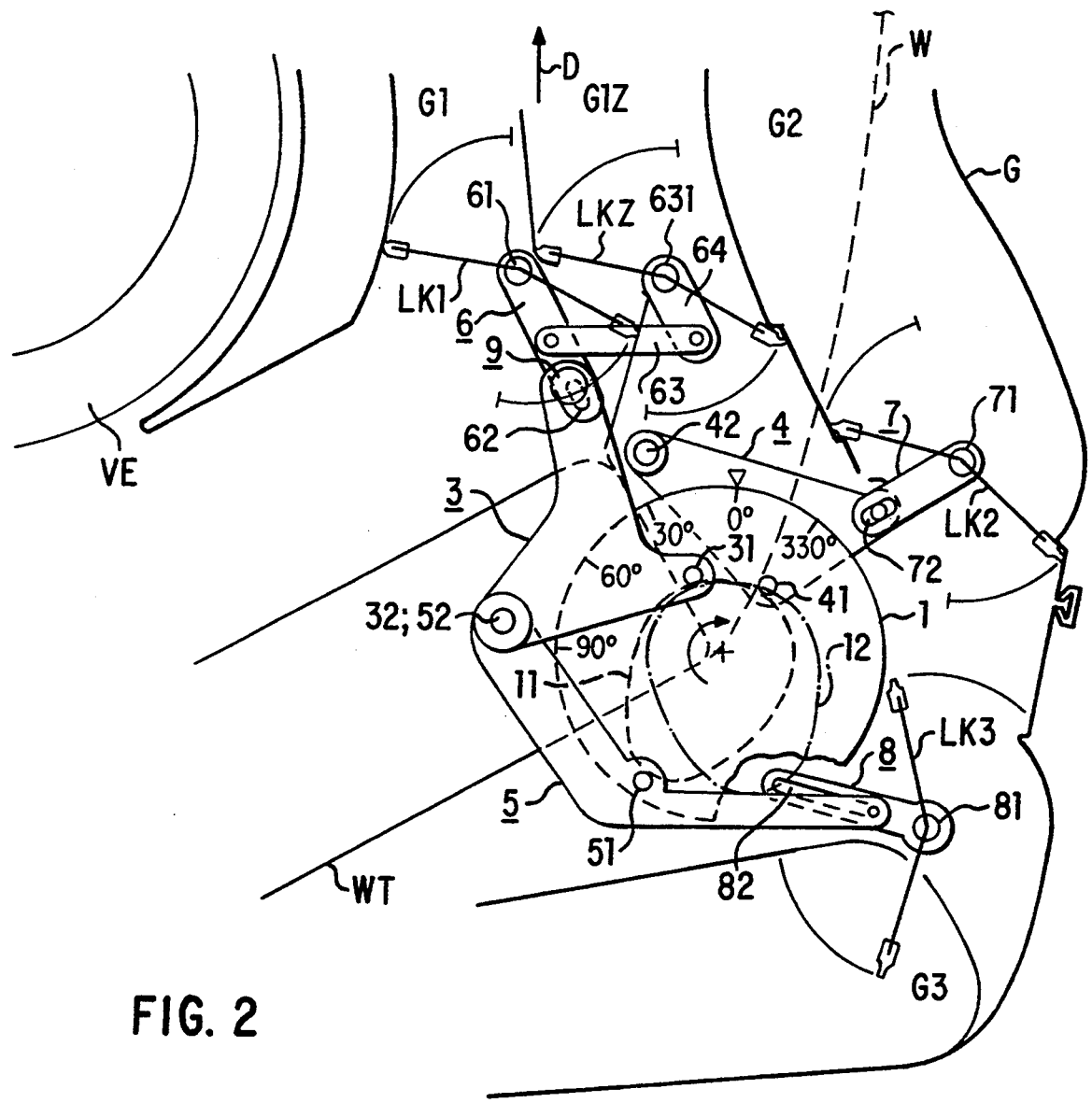
FIG. 2 is a sectional view of the housing of the heating and air-conditioning system constructed according to the principles of the invention in which the links of the first air flap are directly coupled to the supplementary air flap.
Figure 3A:
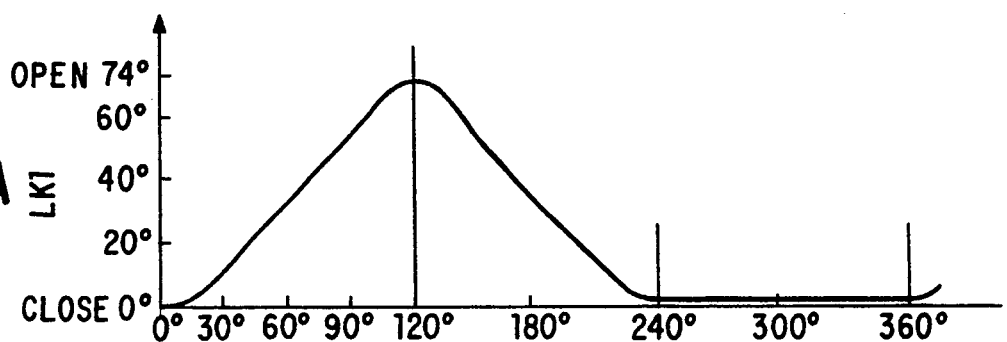
FIGS. 3A, 3B, 3C, 3D and 3E are graphs of positions of the four air flaps adapted to be actuated by the central air control of the control unit for the example of the flap control shown in FIG. 2.
Figure 3B:
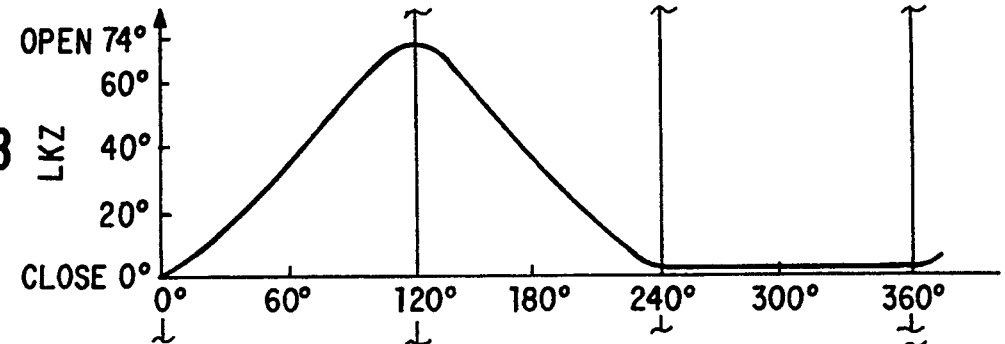
Figure 3C:
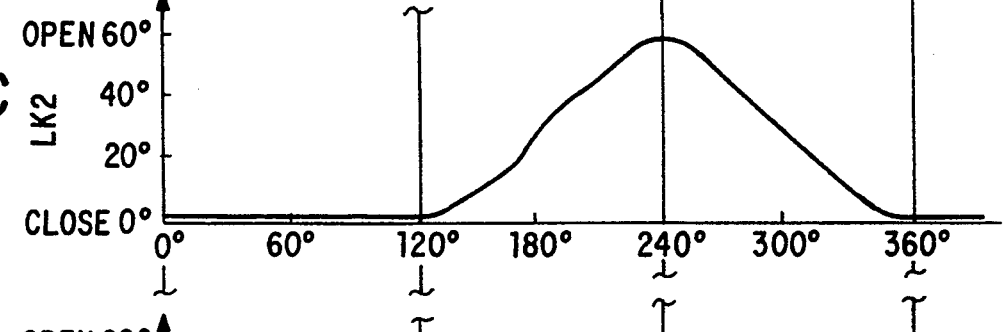
Figure 3D:
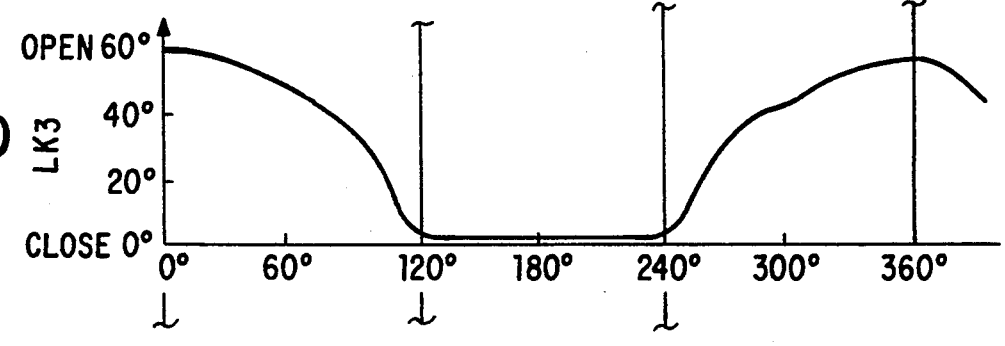
Figure 3E:
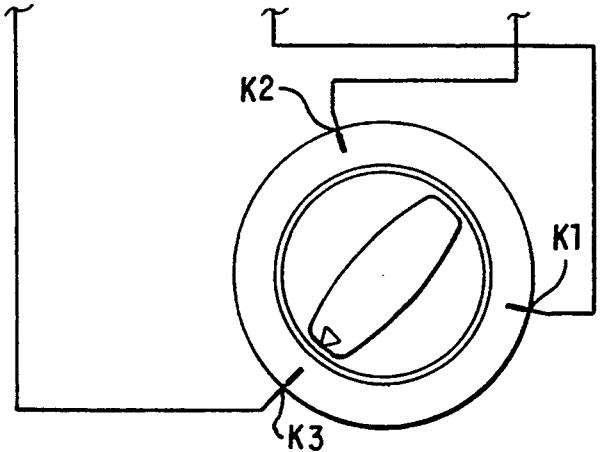

The control knob K linearly drives, via a flexible shaft 2, a slotted disk 1 on the wall of the housing G of the heating and air-conditioning system in a ratio of 1:1, so that a full turn of the knob K produces a complete revolution of the slotted disk 1 in the direction of rotation indicated by the arrow in FIG. 2. The particular manner in which the knob k drives the shaft 2 is not shown in the FIGS. but is merely suggested. Through rotation of the slotted disk 1, and by means of rocker arms 3, 4 and 5 guided therein and links 6, 7 and 8 coupled to the rocker arms, air flaps LK1, LKZ, LK2 and LK3 are actuated between a closed position and an open position over an angular range, indicated in FIG. 2, of about 60° for the second and third air flaps (LK2 and LK3) and of about 75° for the first air flap (LK1) and the supplementary air flap (LKZ).

As a result, a first air flap LK1 in a fresh-air duct G1 is pivoted on a pivot 61, a second air flap LK2 in a defroster air duct G2 is pivoted on a pivot 71, and a third air flap LK3 in a floor-level air duct G3 is pivoted on a pivot 81. For selective actuation with reciprocal positional dependence based on the setting of the control knob K, a track 11 having guide pins 31 and 51 guided therein is provided on the face of the slotted disk 1, and a track 12 having a guide pin 41 guided therein is provided on the back of the slotted disk 1. Guide pin 31 is held in a rocker arm 3 for actuation of the first air flap LK1, while guide pin 51 is held in a rocker arm 5 for actuation of the third air flap LK3. The two rocker arms 3 and 5 are pivoted on a common fixed pivot pin 32 and 52, respectively. The ends of the rocker arms 3, 4 and 5 nearest the air-flaps engage by means of slotted guides 62, 72 and 82, respectively, and links 5, 7 and 8, which are in operative and/or interlocking engagement with the air flaps LK1, LK2 and LK3 via the pivots 61, 71 and 81.

A supplementary air flap LKZ is coupled to the first link 6 that actuates the first air flap LK1 via two additional links 63 and 64. The supplementary air flap LKZ is in a warm-air supplementary duct G1Z of the fresh-air duct G1 and is coupled to the first link 6 in such a way that, depending on the type of coupling, it moves in a linear, progressive or degressive manner as the first link 6 is actuated for actuation of the fresh-air flap LK1. On the discharge side, the fresh-air duct G1 and the warm-air supplementary duct G1Z terminate in a common air duct that leads to a fresh-air nozzle D in the mid-level area of the instrument panel. In place of a single fresh-air nozzle D, lateral nozzles also may be provided so that, if desired, a warmed fresh-air distribution can be obtained over the entire mid-level area by turning the single control knob K to a setting between the settings K1 and K2, or between K1 and K3.

FIG. 2 shows the instantaneous position of the flaps with the control knob in the K3 position, in which only air that may have been heated by the thermostat-controlled heater core WT is admitted to the floor-level area, depending on the position of the temperature selector T. Consequently, air-duct flap LK3 is in the fully-open position while air-duct flaps LK1, LKZ and LK2 are fully closed.

The interdependent opening and closing motions of the air flaps as a function of the instantaneous setting of the control knob K on the central control unit B, and hence as a function of the slotted disk 1, are apparent from the diagram of FIG. 3. FIG. 3 shows the extent, in degrees, to which the air flaps are open over a full 360° revolution of the slotted disk 1, in the direction indicated on the slotted disk shown in FIG. 2, starting from the zero setting of the control knob K and the slotted disk 1 as indicated in FIGS. 1 and 2. Furthermore, as is apparent from the control knob K illustrated in FIG. 3, the 120° position of the slotted disk 1 corresponds to the MID-LEVEL setting of the control knob K, and the 240° position of the slotted disk 1 corresponds to the DEFROSTER setting of the control knob K.

As may be seen particularly in FIG. 2, the fresh air duct G1 and and the warm-air bypass duct (G1Z) and-/or the first air flap LK1 and the supplementary air flap LKZ are advantageously arranged so that in the MID-LEVEL setting the fresh air flows into the mid-level area through both the fresh-air duct G1 and the warm-air supplementary duct G1Z, and closed on the heater-core side by the supplementary air flap (LKZ). Thus, with high outside temperatures, unheated fresh air flows into the mid-level area at a maximum volume rate. Further rotation of the control knob K will cause the supplementary flap to open, and with the flow rate reduced, a greater or lesser fraction of warmed air can be mixed with the fresh air by means of the single central air-distribution control.

Figure 4:
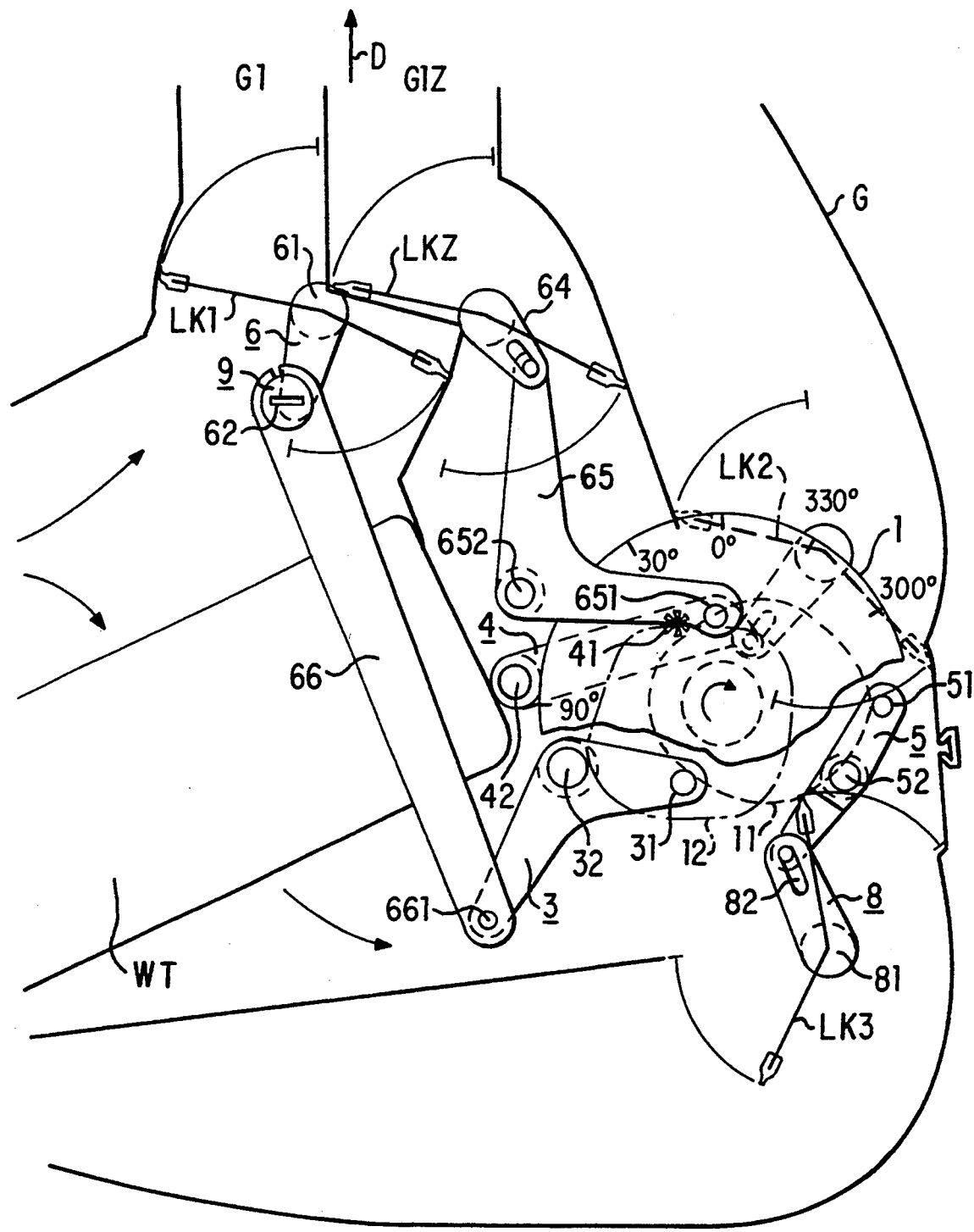
FIG. 4 is a sectional view of the housing of a heating and air-conditioning system according to an alternative embodiment of the invention in which the links of the first air flap are indirectly coupled to the supplementary air flap.
Figure 5A:
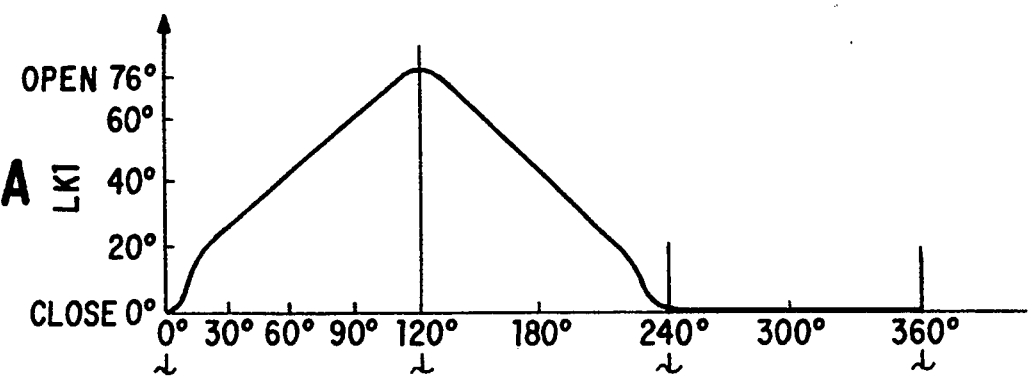
FIGS. 5A, 5B, 5C, 5D and 5E are graphs of positions of the four air flaps adapted to be actuated by the central air control of the control unit for the example of the flap control shown in FIG. 4.
Figure 5B:
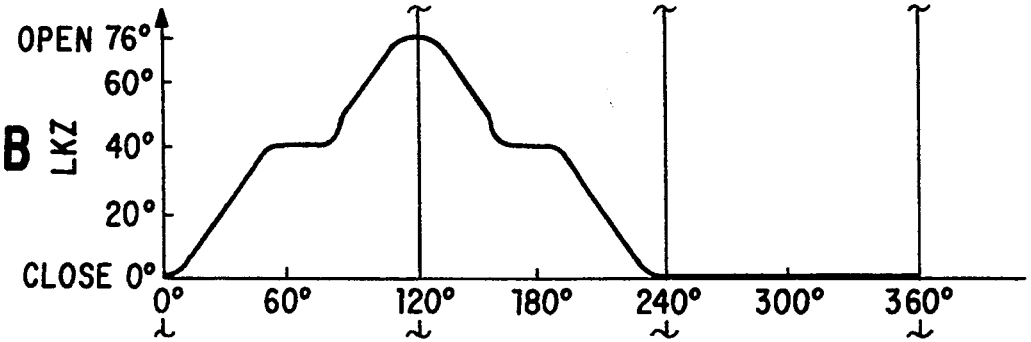
Figure 5C:
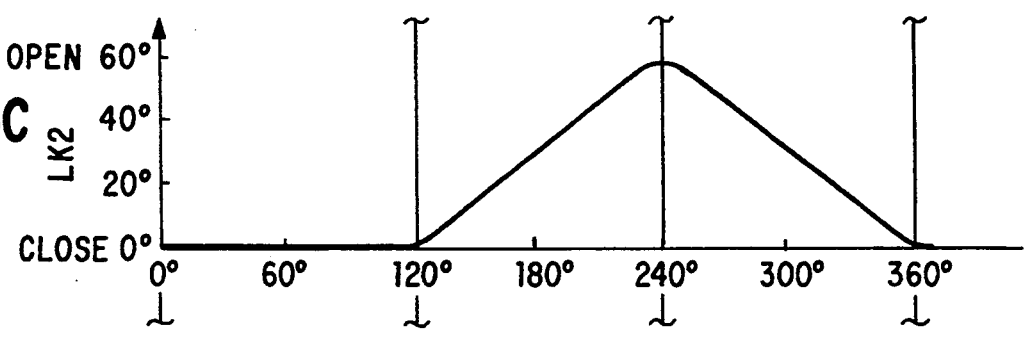
Figure 5D:
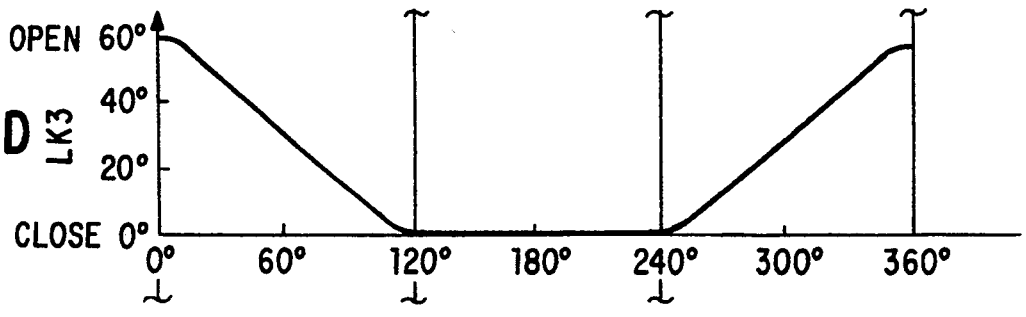
Figure 5E:
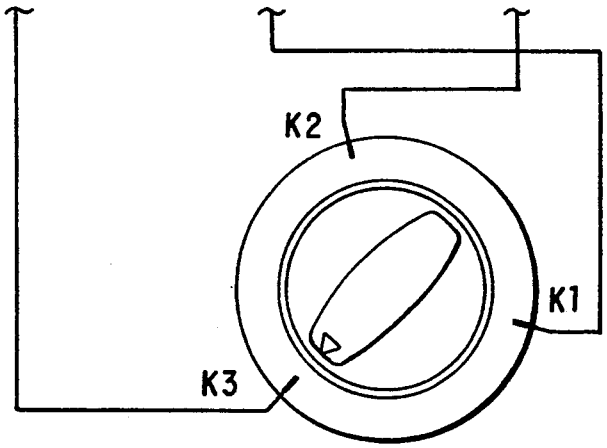

FIG. 4 shows substantially the same design as FIG. 2, but with an indirect coupling between the first air flap LK1 and the supplementary air flap LKZ by means of the slotted disk 1. To accomplish this coupling, the rocker arm 3 is guided by its guide pin 31 in a track 11 on the back of the slotted disk 1 and is pivotable on the fixed pivot pin 32. This is in addition to the guidance of the rocker arm 4 for the second air flap LK2 and the rocker arm 5 for the third air flap LK3. Furthermore, the rocker arm 3 is coupled via a connecting rod 66 to the link 6 for the first air flap LK1. The link 64, pivotable on the pivot 641, of the supplementary air flap LKZ is in driving engagement, via a slotted guide 642, with a rocker arm 65 which is pivotable on a fixed pivot 652 via a guide pin 651 at the end of the rocker arm 65 remote from the slotted guide. The rocker arm 65 is guided by a track 12 on the face of the slotted disk 1 in such a way, as a comparison of the motion diagrams associated with the two air flaps in FIG. 5 will show, that the supplementary air flap LKZ remains in an intermediate hold position in approximately the mid-open or mid-closed position (i.e., about 40° open). Consequently, even though the first air flap LK1 opens or closes to a greater degree, a constant, relatively high proportion of warm air can be mixed with the air for the mid-level area and the movement of the supplementary air flap LKZ, in the sense of a further reduction in the quantity of heated air supplied by the heater core WT, which is thus interrupted for a certain range. In this connection, it should be noted that the supplementary air flap LKZ shuts off the heat input from the outlet side of the heater core WT both in the 0° closed position shown in FIG. 4 and in its other extreme position of about 76°, as indicated by an arc.

The intermediate dwell position of the supplementary air flap LKZ and approximately the mid-open or mid-closed position of the first air flap LK1 can be accomplished in a mechanically simple manner by guiding the rocker arm 65 for the supplementary air flap LKZ, during the intermediate dwell position, over a range of the track on the slotted disk 1 that is concentric with its pivot, and by guiding the rocker arm 3 for the first air flap LK1 over a range Of the track that is not concentric with the pivot of the slotted disk 1, in the sense of further opening or closing.

A particular warming characteristic that meets customer specifications can be obtained by a linear or special nonlinear coupling between the first air flap LK1 and the supplementary air flap LKZ simply by varying only the lever lengths, for example, and/or the pivots of the supplementary-flap coupled to the first air flap LK1.

To simply adjust the four air flaps actuated by a single slotted disk 1, particularly to complete the sealing in the closed positions and to make allowance for tolerances due to the many components to be assembled as well as due to the housing G that is assembled from several parts, an eccentric adjusting element is interposed between the coupling of the slotted disk and the rocker arms, and between the rocker arms and the links, and preferably between the coupling of the link for the first air flap LK1 in the fresh-air duct G1. The eccentric adjusting element 9 is angularly displaceable about an adjusting axis 94 relative to the rocker arm 3, and can be locked in the adjusted position. The adjusting element 9 is coupled to the link 6 through a link pin 91 that is eccentrically offset from the adjusting axis 94.

Figure 6:
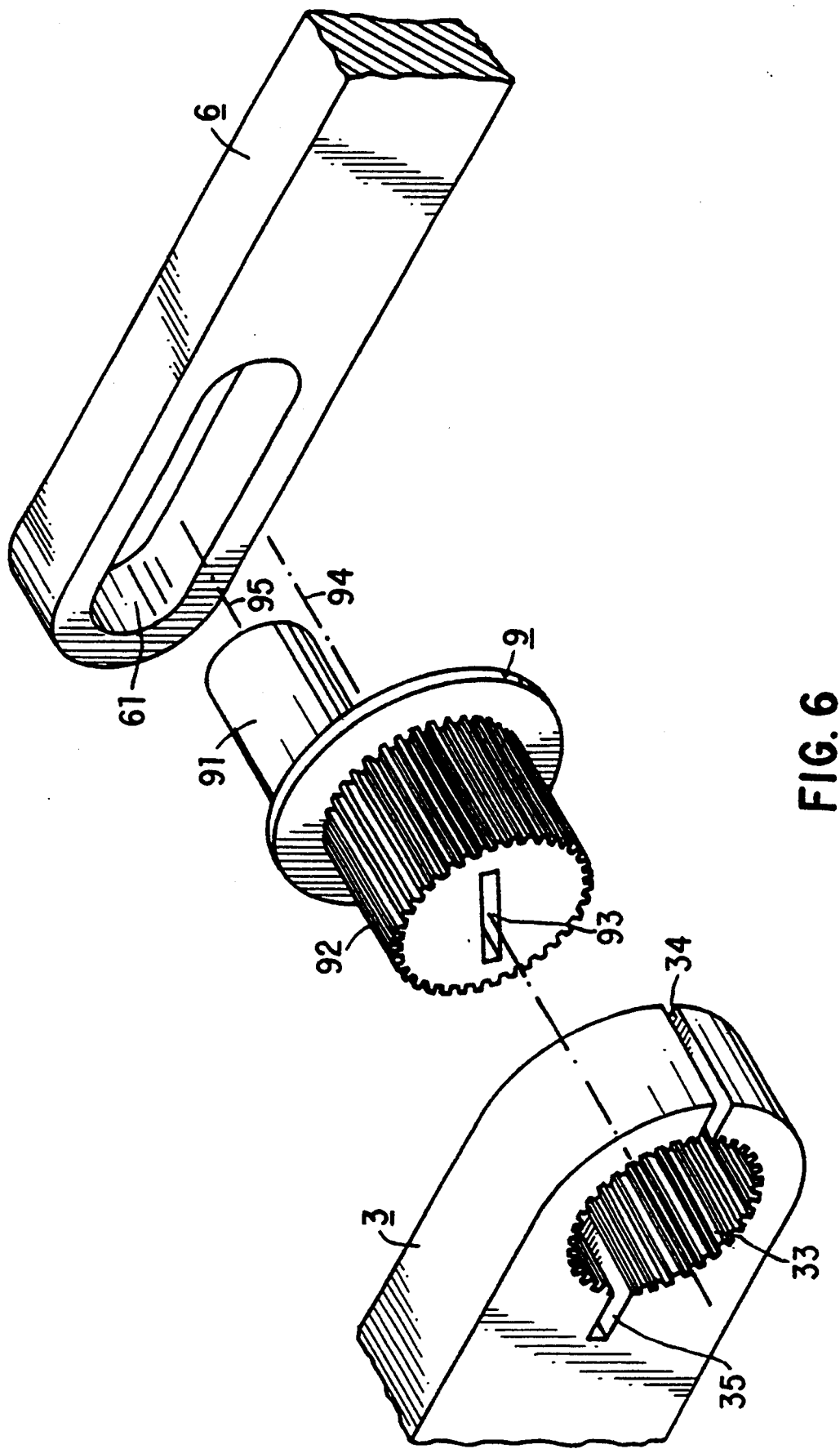
FIG. 6 is an exploded perspective view of an eccentric adjusting element disposed between two levers which are coupled by means of a swivel joint utilized in the air-flap actuating means of FIG. 2.

Such an advantageous, simple eccentric adjustment is shown in FIG. 6 in terms of the coupling of the rocker arm 3 for the first air flap LK1 to the associated link 6 through its slotted guide 61. The eccentric adjusting element 9 is, on the one hand, angularly displaceable by an adjusting pin 92 having external detent splining in an adjusting opening 33 and by a corresponding internal detent splining of the rocker arm 3 about an adjusting axis 94 and is adapted to be locked in the adjusted end position. On the other hand, the eccentric adjusting element is coupled to the link 6 through a link pin 91 which is eccentrically offset from the adjusting pin 92 and the adjusting axis 94 and it engages the slotted guide 61.

After the heating and air-conditioning system has been completely assembled, the eccentric adjusting element 9 can be positioned by inserting a screwdriver in a slot 93 disposed in the free end face of the adjusting pin 92 and turning it in the adjusting opening 33 of the rocker arm by overcoming the detent resistance. Thus, the coupling point of the link pin 91 in the slotted guide 61 of the link 6 is shifted, and as a result the air flap so coupled occupies a somewhat modified position relative to the other air flaps. The adjusting opening 33 for the eccentric adjusting element 9 in the rocker arm 3 is advantageously provided with an outwardly open expansion slot 34 and/or an opposite expansion slot 35 to permit resilient expansion of the opening to overcome the resistance of the detent splining while preventing an undesired displacement of the adjusting element 9 during the operative driving engagement of rocker arm 3 and link 6.

What is claimed is:

1. A method for controlling fresh-air in a mid-level area of an instrument panel of a motor vehicle with a heating and air-conditioning system that is controlled by a thermostat on a water side and a central control unit having an air-distribution control formed as a control knob that has a FLOOR LEVEL setting, a DEFROSTER setting, and a MID-LEVEL setting therebetween, said method comprising the steps of:
   actuating, with the control knob, a first air flap disposed in a fresh-air duct;
   supplying fresh air to at least one fresh-air nozzle in the mid-level area when said first air flap is open;
   controlling, with the control knob, a supplementary air flap disposed in a warm-air supplementary duct, via the first air flap that is directly coupled to the supplementary air flap;

supplying the fresh-air nozzle with air by the supplementary air flap when said supplementary air flap is open:

positioning the control knob such that in the MID-LEVEL setting the first air flap is in an open position for fresh-air admission to said fresh air nozzle and the supplementary air flap is in a closed position relative to a heater core;

positioning the control knob such that in a setting between the MID-LEVEL and DEFROSTER or between MID-LEVEL and FLOOR LEVEL settings the first air flap is in the open position for fresh-air admission and the supplementary air flap is in the open position relative to the heater core; and positioning the control knob such that in a the DEFROSTER setting or the FLOOR LEVEL setting the first air flap is in the closed position for fresh-air admission and the supplementary air flap is in the closed position relative to the heater core.

2. A method for fresh-air control as defined in claim 1 further comprising the step of positioning the first air flap and the supplementary air flap in an approximately half-open position or bi-level position when the control knob is midway between the MID-LEVEL setting and the DEFROSTER setting on one side and the FLOOR LEVEL setting on the other side.

3. A method as defined in claim 2 wherein when the first air flap and the supplementary air flap are in the bi-level position the air flow issuing from the fresh-air nozzle has a lower temperature than the air flow exiting an air duct that supplies air to a floor area, but has a higher temperature than when the control knob is in the MID-LEVEL setting.

4. A method as defined in claim 3 wherein a volume of air flowing from the fresh-air nozzle is less in the bi-level position than in the MID-LEVEL setting of the control knob.

5. A method as defined in claim 3 wherein the volume of air flowing from the fresh-air nozzle is reduced with increasing temperature when the control knob is rotated away from the bi-level position in the direction of the DEFROSTER or the FLOOR LEVEL setting.

6. A method as defined in claim 4 wherein the volume of air flowing from the fresh-air nozzle is reduced with increasing temperature when the control knob is rotated away from the bi-level position in the direction of the DEFROSTER or the FLOOR LEVEL setting.

7. A method for controlling fresh-air in a mid-level area of an instrument panel of a motor vehicle with a heating and air-conditioning system that is controlled by a thermostat on a water side and a central control unit having an air-distribution control formed as a control knob that has a FLOOR LEVEL setting, a DEFROSTER setting, and a MID-LEVEL setting therebetween, said method comprising the steps of:

actuating, with the control knob, a first air flap disposed in a fresh-air duct;

supplying fresh air to at least one fresh-air nozzle in the mid-level area when said first air flap is open;

controlling, with the control knob, a supplementary air flap disposed in a warm-air supplementary duct, via the first air flap that is directly coupled to the supplementary air flap;

supplying the fresh-air nozzle with air from the warm air supplementary duct when the supplementary air flap is open;

positioning the control knob such that in the MID-LEVEL setting the first air flap is in an open position for fresh-air admission and the supplementary air flap is in a closed position relative to a heater core;

positioning the control knob such that in a setting between the MID-LEVEL and DEFROSTER or between MID-LEVEL and FLOOR LEVEL setting the first air flap is in the open position for fresh-air admission and the supplementary air flap is in the open position relative to the heater core; and positioning the control knob such that in the DEFROSTER setting or the FLOOR LEVEL setting the first air flap is in the closed position for fresh-air admission and the supplementary air flap is in the closed position relative to the heater core;

mixing a substantially constant, high proportion of warm air with fresh air in the mid-level area when the first air flap is in approximately a mid-open or mid-closed position even though the first air flap travels over a longer path during its opening or closing motion via an intermediate holding position of the supplementary air flap.

8. A method for fresh-air control as defined in claim 7 further comprising the step of positioning the first air flap and the supplementary air flap in an approximately half-open position or bi-level position when the control knob is midway between the MID-LEVEL setting and the DEFROSTER setting on one side and the FLOOR LEVEL setting on the other side.

9. A method for fresh-air control in a mid-level area of a motor vehicle with a heating an air-conditioning system including a central control unit having an air-distribution control formed as a control knob that has a FLOOR-LEVEL position, a DEFROSTER position, and a MID-LEVEL position therebetween, said method comprising the steps of:

a) actuating, with the control knob, a firs air flap disposed in a fresh-air duct;

b) supplying fresh air to at least one fresh-air nozzle int he mid-level are when said first air flap is open;

c) controlling, with the control knob, a supplementary air flap disposed in a warm-air supplementary duct, via the first air flap, that is coupled with the supplementary air flap;

d) supplying fresh ari to a fresh air nozzle in the mid-level area when first air flap is open;

e) positioning the control nob such that int he MID-LEVEL setting the first air flap is in an open position for fresh-air admission to said fresh air nozzle and the supplementary air flap is in a closed position relative to a heater core;

f) positioning the control knob such that in a setting between the MID-LEVEL and DEFROSTER or between MID-LEVEL and FLOOR LEVEL settings, the first air flap is in the open position for fresh-air admission and the supplementary air flap is int he open position relative to the heater core; and g) positioning the control knob such that in the DEFROSTER setting or the FLOOR LEVEL setting, the first air flap is int eh closed position for fresh-air admission and the supplementary air flap is in the closed position relative to the heater core.

10. The method of claim 9 wherein said supplemental air flap is directly coupled with said first air flap.

11. The method of claim 9 wherein said supplemental air flap is indirectly coupled with said first air flap.

12. The method of claim 10 further comprising the steps of:
   h) when the control knob is midway between the MID-LEVEL position and the DEFROSTER position,
      positioning the first air flap and the supplemental air flap in an approximately half-open position or bi-level position; and
   i) when the control knob is midway between the MID-LEVEL position and the FLOOR LEVEL position,
      positioning the first air flap and the supplemental air flap in an approximately half-open position or bi-level position.

13. The method of claim 11 further comprising the steps of:
   h) when the control knob is midway between the MID-LEVEL position and the DEFROSTER position,
      positioning the first air flap and the supplemental air flap in an approximately half-open position or bi-level position; and
   i) when the control knob is midway between the MID-LEVEL position and the FLOOR LEVEL position,
      positioning the first air flap and the supplemental air flap in an approximately half-open position or bi-level position.

14. The method of claim 12 further comprising the steps of:
   j) when the control knob is midway between the MID-LEVEL position and the DEFROSTER position,
      providing air flowing from said fresh ari nozzle with a lower temperature than air flowing from an air duct supplying the floor area; and
   k) when the control knob is midway between the MID-LEVEL position and the FLOOR LEVEL position,
      providing air flowing from said fresh air nozzle with a lower temperature than air flowing from an air duct supplying the floor area.

15. The method of claim 13 further comprising the steps of:
   j) when the control knob is midway between the MID-LEVEL position and the DEFROSTER position,
      providing air flowing from said fresh ari nozzle with a lower temperature than air flowing from an air duct supplying the floor area; and
   k) when the control knob is midway between the MID-LEVEL position and the FLOOR LEVEL position,
      providing air flowing from said fresh air nozzle with a lower temperature than air flowing from an air duct supplying the floor area.

16. The method of claim 14 further comprising the steps of:
   l) when the control knob is midway between the MID-LEVEL position and the DEFROSTER position,
      decreasing the volume of air flow from the fresh-air nozzle relative to the air flow existing when the control knob is in the MID-LEVEL position; and
   m) when the control knob is midway between the MID-LEVEL position and the FLOOR LEVEL position,
      decreasing the volume of air flow from the fresh air nozzle relative to the air flow existing when the control knob is in the MID-LEVEL position.

17. The method of claim 15 further comprising the steps of:
   l) when the control knob is midway between the MID-LEVEL position and the DEFROSTER position,
      decreasing the volume of air flow from the fresh-air nozzle relative to the air flow existing when the control knob is in the MID-LEVEL position; and
   m) when the control knob is midway between the MID-LEVEL position and the FLOOR LEVEL position,
      decreasing the volume of air flow from the fresh air nozzle relative to the air flow existing when the control knob is in the MID-LEVEL position.

18. The method of claim 14 further comprising the steps of:
   l) when said first air flap is moved toward said open state or toward said closed state from said mid-way sate,
      reducing the volume of the air flow from said fresh air nozzle, and
      increasing the temperature of the air flowing from said fresh air nozzle.

19. The method of claim 15 further comprising the steps of:
   l) when said first air flap is moved toward said open state or toward said closed state from said mid-way sate,
      reducing the volume of the air flow from said fresh air nozzle, and
      increasing the temperature of the air flowing from said fresh air nozzle.

20. The method of claim 16 further comprising the steps of:
   l) when said first air flap is moved toward said open state or toward said closed state from said mid-way sate,
      reducing the volume of the air flow from said fresh air nozzle, and
      increasing the temperature of the air flowing from said fresh air nozzle.

21. The method of claim 17 further comprising the steps of:
   l) when said first air flap is moved toward said open state or toward said closed state from said mid-way sate,
      reducing the volume of the air flow from said fresh air nozzle, and
      increasing the temperature of the air flowing from said fresh air nozzle.

22. A system for implementing the method of claim 11 comprising:
   a slotted disk, said slotted disk adapted for rotation by said air-distribution control and having a first and a second endless track;
   a first, second, third and fourth rocker arm, each of said rocker arms being guided by at least one of said first and second endless tracks;
   a first, second, third and fourth link, each of said plurality of links including a slotted guide accommodating and guiding an arm of a corresponding one of said plurality of rocker arms, wherein said first link is coupled with said first air flap in a angular-position-dependant manner, said second link is coupled with a second air flap, said third link is coupled with a third air flap, and said fourth link is coupled with said supplementary air flap.

23. The system of claim 22 further comprising a first connecting rod, said first connecting rod coupling said first rocker arm with said first link.

24. The system of claim 22 wherein said first endless track si substantially concentric with a pivot of said slotted disk and said second endless track si not concentric with said pivot of said slotted disk and wherein said fourth rocker arm is guided by said first endless track and said first rocker arm is guided by said second endless track.

25. The system of claim 22 wherein said firs endless track is provided on a frontal surface of said slotted disk and said second endless track is provided on a rear surface of said slotted disk, and wherein one of said first and second slotted tracks guide said first, second, and third rocker arms while the other of said first and second slotted tracks guides said fourth rocker arm.

26. The system of claim 22 further comprising an eccentric adjusting element disposed between said first rocker arm and said first link.

27. The system of claim 26 wherein said eccentric adjusting element defines an adjusting axis about which said eccentric adjusting element is lockable and angularly displaceable relative to the rocker arm and includes a link pin eccentrically offset from said adjusting axis and coupling said eccentric adjusting element with said first link.

28. In a ventilation system including,
- a control knob having a DEFROST position, a FLOOR LEVEL position, and a MID-LEVEL position,
- a fresh air duct supplying a fresh air nozzle,
- a first air flap provided in the fresh air duct and having an open state and a closed state,
- a warm air supplementary duct supplying the fresh air nozzle, and
- a supplemental air flap provided in the warm air supplementary duct, having an open state and a closed state, and coupled with said first air flap, a method for controlling the ventilation system including steps of:
a) when said control knob is in said MID-LEVEL position,
  i) position said first air flap in it open state, and
  ii) positioning said supplemental air flap in its closed state;
b) when said control knob is in said DEFROSTER position,
  i) position said first air flap in it open state, and
  ii) positioning said supplemental air flap in its closed state;
c) when said control knob is in said FLOOR LEVEL position,
  i) position said first air flap in it open state, and
  ii) positioning said supplemental air flap in its closed state;
d) when said control knob is in between said MID-LEVEL position and said DEFROSTER position,
  i) positioning said firs air flap in its open state, and
  ii) positioning said supplemental air flap in its open state; and
e) when said control knob is in between said MID-LEVEL position and said FLOOR LEVEL position,
  i) positioning said first air flap in its open state, and
  ii) positioning said supplemental air flap in its open state.

29. The method of claim 28 wherein said first air flap has a continuous range of states between said open state and said closed state including a state about mid-way between said open state and said closed state, such that
f) when said first air flap is moved toward said open state or toward said closed state from said mid-way state, the method includes a further step of
  i) maintaining the position of said supplementary air flap.

30. The method of claim 28 wherein said supplemental air flap is directly coupled with said first air flap.

31. The method of claim 28 wherein said supplemental air flap is indirectly coupled with said first air flap.

* * * * *